United States Patent
Grau et al.

(10) Patent No.: US 9,856,328 B1
(45) Date of Patent: Jan. 2, 2018

(54) METHODS FOR MODIFYING NITROCELLULOSE HAVING LYOPHOBIC PROPERTIES

(71) Applicant: The United States of America as Represented by the Secretary of the Army, Washington, DC (US)

(72) Inventors: Henry Grau, Wantage, NJ (US); Alexander Fadeev, Yardley, PA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/170,999

(22) Filed: Jun. 2, 2016

(51) Int. Cl.
*C08B 11/14* (2006.01)
*C08B 5/02* (2006.01)
*C06B 25/18* (2006.01)

(52) U.S. Cl.
CPC ................ *C08B 5/02* (2013.01); *C06B 25/18* (2013.01)

(58) Field of Classification Search
CPC ............ C08B 5/02; C08B 11/14; C06B 25/18

USPC .................................................... 536/35, 124
See application file for complete search history.

(56) References Cited

FOREIGN PATENT DOCUMENTS

DE          2402841 A1 *  7/1975  .......... C08G 63/672

* cited by examiner

*Primary Examiner* — Shaojia Anna Jiang
*Assistant Examiner* — Everett White
(74) *Attorney, Agent, or Firm* — John P. DiScala

(57) ABSTRACT

Described herein are methods for chemical modification of nitrocellulose to generate lyophobic properties which are useful in propellant compositions. Such methods include the steps of: a) dissolving neat nitrocellulose in an organic solvent; b) adding a silyl based isocyanate and a catalyst to the solution; (d) stirring the solution in a moisture free environment; e) hydrolyzing the solution by exposing said solution to moisture; and (e) adding fluorinated oxysilane. The modified nitrocellulose retains its energetic properties while exhibiting high water and organic solvent phobicity, effectively functioning as a barrier to migration or diffusion of liquid components in propellant compositions.

13 Claims, 5 Drawing Sheets

METHODS FOR MODIFYING NITROCELLULOSE HAVING LYOPHOBIC PROPERTIES

RIGHTS OF THE GOVERNMENT

The inventions described herein may be manufactured and used by or for the United States Government for government purposes without payment of any royalties.

FIELD OF INVENTION

The invention herein relates to chemical modification of nitrocellulose useful in propellant compositions. More specifically, neat nitrocellulose is reacted with silyl based isocyanate and fluorinated oxysilane to prepare modified nitrocellulose having lyophobic properties.

BACKGROUND OF THE INVENTION

Nitrocellulose based propellants are used in the initiation of ammunition systems such as rockets and projectiles. In firearms, propellants fill the interior of an ammunition cartridge chamber of a gun or cannon, leading to the expulsion of a bullet or shell.

Solid propellants are categorized according to the number of active components in the propellant. For instance, single-based propellants primarily contain low-order explosive powder such as nitrocellulose. Double-base propellant, consists of nitrocellulose and nitroglycerine, plus additives in small quantity. The molecules are unstable, and when ignited, they break apart and rearrange themselves, liberating large quantities of heat. These propellants lend themselves well to smaller rocket motors. They are often processed and formed by extrusion methods, although casting has also been employed.

Numerous additives are used in solid propellants to improve their burn rate, stability, sensitivity, and mechanical properties. Additives such as plasticizers may be used to process fluid materials in the propellant mix and improve the mechanical properties of the propellant compositions. Nitroglycerin, a liquid explosive, may also function as a plasticizer. While nitroglycerin has the dual properties of being an energetic and a plasticizer, it has the tendency to migrate throughout a propellant grain leading to performance and safety problems. For instance, long term storage of nitroglycerin-based propellants has caused explosions and fires due to migration of the energetic material through the propellant matrix.

Diffusion and migration of propellant constituents can also arise with co-extruded propellants. A co-extrusion propellant is a dual system with an inner and outer core having its own constituents independent of one another to control the propellant's burn rate. The inner core is known for its high energy density and burns much hotter than the outer core. The outer core may be formulated with nitrocellulose which acts to minimize the extremely hot burn of the inner core. The purpose is to have the plasticizers that burn hot contained in the inner core of the propellant, leaving the outer core as a single-based nitrocellulose. Problems arise when plasticizers such as nitroglycerin diffuse into the outer portion of the propellant grain thus, defeating the intended purpose of the co-extruded grain.

One solution is to coat the propellants, however, these coatings do not effectively contain the plasticizers. This is due to the presence of cracks and voids that are naturally produced during a coating process. Furthermore, propellant coatings affect the performance of the propellant and poses incompatibility issues over time. For instance, some coatings are useful only in low temperature and humidity environments. When environmental conditions fluctuate, the components may continue to migrate.

Accordingly, a need exists to prevent migration or diffusion of components such as nitroglycerin in propellant compositions without compromising the desired energetic properties of the propellant.

SUMMARY OF THE INVENTION

The present invention chemically modifies neat (i.e. raw) nitrocellulose to create a hydrophobic surface interface that prevents the migration or diffusion of energetic plasticizers in propellants. The modified nitrocellulose has equivalent energy output, ignition temperature, and decomposition rate comparable to neat nitrocellulose.

One aspect of the invention is a process for preparing modified nitrocellulose having lyophobic properties by:
(a) preparing a solution comprising hydroxysiloxane nitrocellulose by dissolving neat nitrocellulose in an organic solvent;
(b) adding an silyl based isocyanate to the solution;
(c) adding dibutyl tin dilurate to the solution as a catalyst;
(d) stirring the solution in a moisture free environment;
(e) hydrolyzing the solution by exposing said solution to moisture;
(f) adding a fluorinated oxysilane;
(g) filtering and washing the modified nitrocellulose; and
(h) drying said modified nitrocellulose.

In another aspect of the invention, the modified nitrocellulose described by the process herein is used in propellant compositions to prevent migration of plasticizers within the composition.

In a further aspect of the invention, the modified nitrocellulose described by the process herein is used in a co-extruded propellant composition comprising inner and outer layers wherein modified nitrocellulose prevents the migration of the plasticizers through the inner or outer layers of the co-extruded propellant.

The invention will be better understood, and further objects, features, and advantages thereof will become more apparent from the following description of the preferred embodiments taken in conjunction with the accompanying drawings.

DETAILED DESCRIPTION

Figure 1:
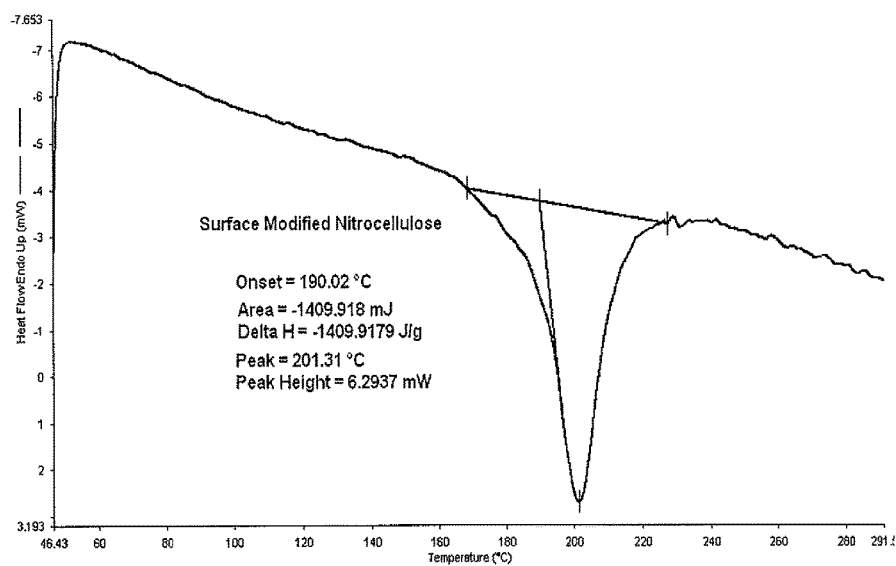
FIG. 1 is a Differential Scanning calorimetry (DSC) thermal scan of the modified nitrocellulose.

The present invention discloses methods for modifying neat (i.e. raw) nitrocellulose to create a lyophobic surface interface that prevents the migration or diffusion of energetic plasticizers such as nitroglycerin in propellants. This is achieved by chemically modifying the surface of the nitrocellulose with fluorinated silanes, oligomers and polymers. The modified lyophobic nitrocellulose produced herein has equivalent energy output, ignition temperature, and decomposition rate to neat nitrocellulose.

The process for preparing modified nitrocellulose is initiated by dissolving neat nitrocellulose in an organic solvent and reacting the surface hydroxyl groups on the nitrocellulose with a silyl based isocyanate in the presence of a catalyst. The silyl isocyanate is covalently attached to the nitrocellulose which results in additional hydroxyl groups for further modification by crosslinking effects of siloxanes. Crosslinking of siloxanes occurs in the presence of water which in turn promotes hydrolysis. The crosslinking moiety acquires more hydroxyl groups for further reaction to promote increased phobicity of the modified surface by the addition of tridecafluorotrimethyoxysilane.

The chemical process for modifying raw nitrocellulose is illustrated by Scheme I show below:

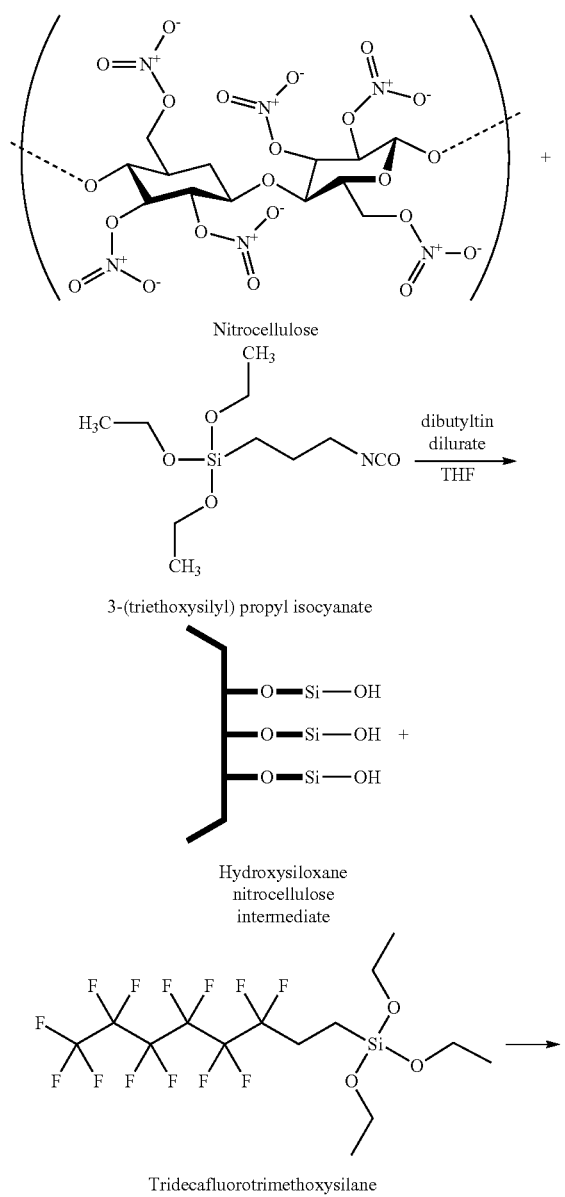

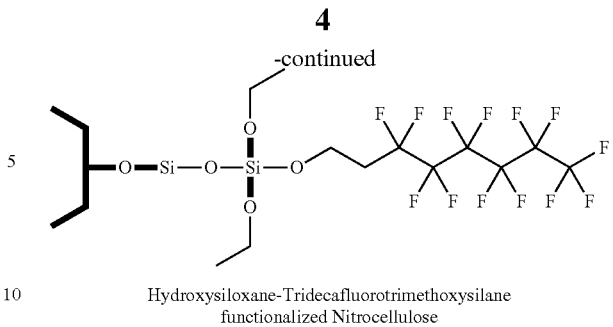

Hydroxysiloxane-Tridecafluorotrimethoxysilane functionalized Nitrocellulose

Tridecafluoro-1,1,2,2-tetrahydrooctyl-trimethoxysilane is preferred, however, other fluorinated silanes, oligomers, and polymers including fluoro-alkyl containing polymers can be used in the present invention. Lyophobic modification of nitrocellulose are not only achieved by covalent bonding with fluorine but other low energy molecules can be added as well. These include alkyl functional groups and acyl/alkyl silanes, as well as linear/cyclic oligomers. Representative examples of these groups include propionyl chlorides, dimethyldichlorosilanes, n-octadecyldimethylchlorosilane, and epoxy acrylate oligomers.

A non-limiting example of the present invention is illustrated in the following example.

Example 1

Dissolve 2.0 grams of either 11.05% or 13.14% nitrocellulose in 50 ml of tetrahydrofuran (THF) and stir for forty eight hours in a moisture free environment. This allows sufficient time to completely expose the nitrocellulose polymer chain for hydroxyl group interaction with the isocyanate. Add 1 ml of 3-(triethoxysilyl) propyl isocyanate dropwise. Add 3 milliliters of dibutyl tin dilurate as the reaction catalyst and stir for a minimum of 4 hours up to 24 hours to ensure complete reaction of the isocyanate. Open reaction vessel for slow exposure to atmospheric moisture for slow hydrolysis. Excess THF may be added to compensate for solvent evaporation. Add 1 ml of (tridecafluoro-1,1,2,2-tetrahydrooctyl) trimethoxysilane and stir for 24 hours to allow for complete reaction to occur. Separate the reacted material with 50 ml of water or other suitable solvent. The solid material is then filtered and washed several times with excess water. The functionalized nitrocellulose is then dried at 60° C. for one hour.

Testing and Characterization of the Modified Nitrocellulose

Modified nitrocellulose was characterized to determine the degree of surface functionality and to determine if the performance of nitrocellulose was changed. Water sink tests were performed and showed that the functionalized nitrocellulose remained buoyant compared to neat nitrocellulose which sinks immediately when exposed to a water bath.

Figure 2:
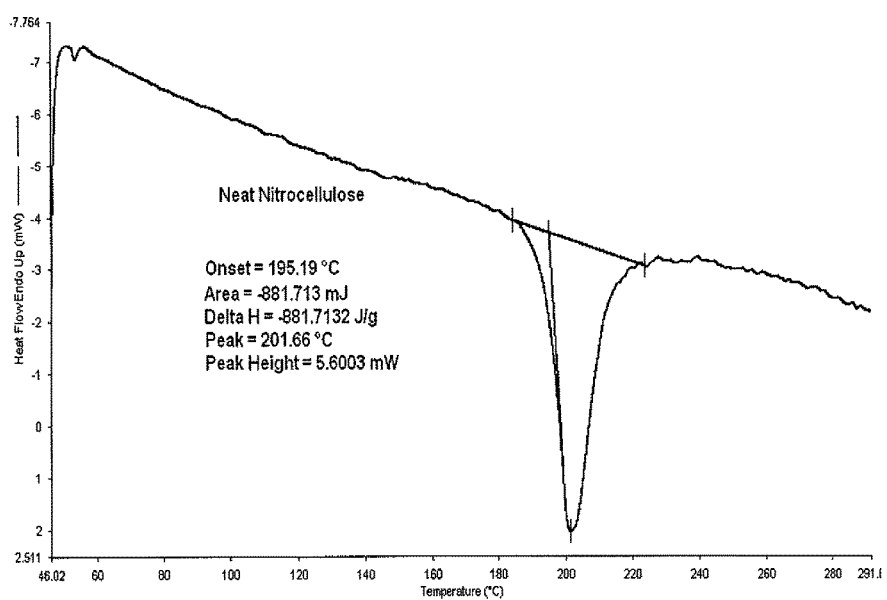
FIG. 2 is a Differential Scanning calorimetry (DSC) scan of a baseline (unmodified) nitrocellulose.
Figure 3:
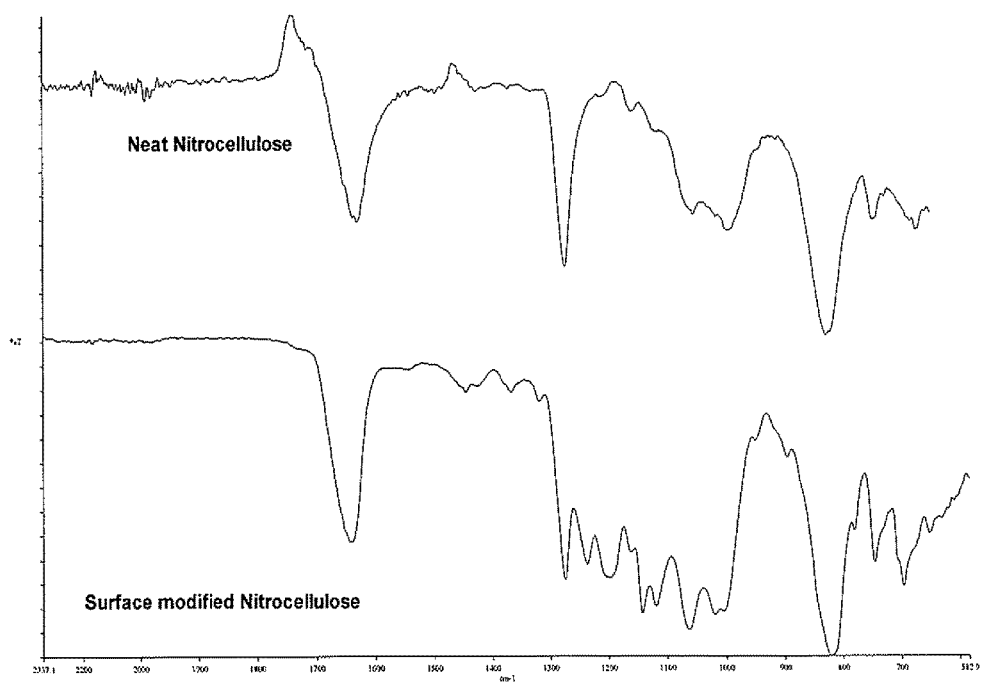
FIG. 3 is a FTIR scan of functionalized nitrocellulose vs. baseline nitrocellulose showing formation of new peaks that represented functional groups.

Chemical characterization. Differential scanning calorimetry (DSC) was utilized to compare baseline (neat) nitrocellulose and modified nitrocellulose. The results as shown in FIG. 1 (modified) and FIG. 2 (baseline) confirm that ignition temperature and enthalpy is comparable to baseline. FIG. 3 is Fourier Transform Infrared (FTIR) analysis showing new functional groups in the fingerprint region of the modified nitrocellulose compared to baseline nitrocellulose. The results also show that the nitro groups are still intact after synthesis.

Size exclusion chromatography was performed on the functionalized nitrocellulose. Table 1 illustrates an increase of molecular weight distribution for the functionalized nitrocellulose versus the neat nitrocellulose.

TABLE 1

Molecular Weight Distribution of Modified vs. Unmodified Nitrocellulose.

|  | Mn (kDa) | Mw (kDa) |
|---|---|---|
| 11.04% nitrated reference NC in THF | 78588 | 878899 |
| 11.04% nitrated reference NC in THF | 76447 | 994608 |
| 11.04% nitrated reference NC in THF | 75397 | 1.99E+06 |
| 11.04% nitrated reference NC in THF | 75740 | 1.87E+06 |
| 11.04% functionalized NC in THF | 91301 | 1.18E+06 |
| 11.04% functionalized NC in THF | 86306 | 9.35E+05 |
| 11.04% functionalized NC in THF | 96289 | 2.27E+06 |
| 11.04% functionalized NC in THF | 113222 | 2.79E+06 |
| 13.15% nitrated reference NC in THF | 76434 | 780969 |
| 1315% nitrated reference NC in THF | 80773 | 808801 |
| 13.15% nitrated functionalized NC in THF | 94417 | 616836 |
| 13.15% nitrated functionalized NC in THF | 76606 | 979713 |

Figure 4:
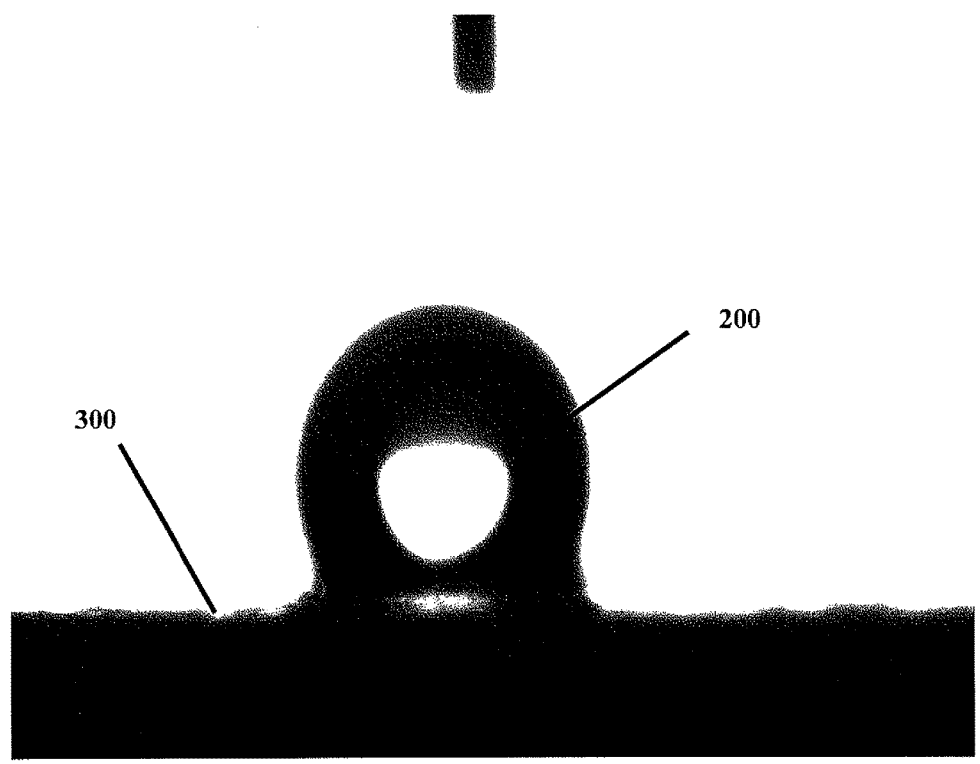
FIG. 4 is an image of a water droplet dispensed on a modified nitrocellulose surface.
Figure 5:
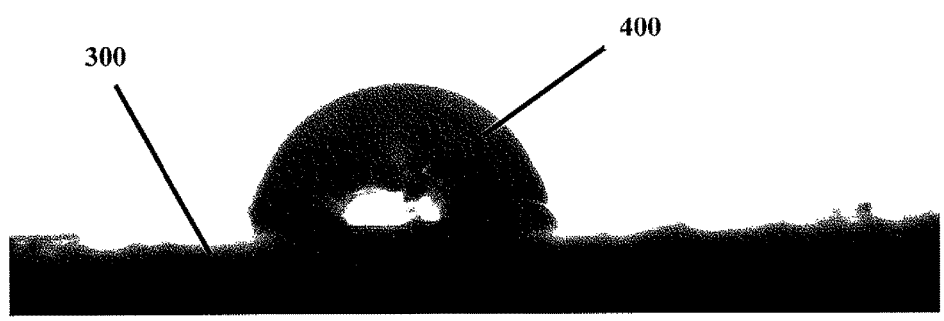
FIG. 5 is an image of a nitroglycerin droplet on nitrocellulose.

Table 2 provides the contact angle using hexadecane, water, and nitroglycerin as probe fluids. Compared to the neat nitrocellulose, the modified nitrocellulose revealed high contact angles which is evidence of functionalization on the material's surface. FIG. 4 illustrates a water droplet 200 beading on the surface of the modified nitrocellulose 300. FIG. 5 illustrates a nitroglycerin droplet 400 on modified nitrocellulose 300. In another experiment, a comparison of the surface functionalized nitrocellulose with that of neat nitrocellulose was performed with a droplet of nitroglycerin dropped on each surface. The results indicated that functionalized surface is phobic to nitroglycerin whereas complete wetting occurs on the neat nitrocellulose.

TABLE 2

Contact Angles of Treated vs. Untreated Nitrocellulose

| Probe fluid | Surface mod w/ triethoxysilyl NCO Contact angle Θ avg.(°) | Surface mod w/addition of tridecafluorotri-methoxysilane Contact angle Θ avg.(°) | Neat NC 13.1% Contact angle Θ avg.(°) |
|---|---|---|---|
| H20 (static) | 105 | 115 | complete wetting |
| Hexadecane Advancing/ Receding | 33/0 | 80/55 | complete wetting |

Elemental analysis showed the presence of fluorine and silicon concentrations for the functionalized nitrocellulose.

While the invention has been disclosed with reference to certain preferred embodiments and examples; numerous changes, alternations and modifications are possible without departing from the spirit and scope of this invention as defined in the appended claims and equivalents thereof.

What is claimed is:

1. A process for preparing modified nitrocellulose having lyophobic properties comprising:
    (a) dissolving neat nitrocellulose in an organic solvent to form a solution;
    (b) adding silyl based isocyanate to the solution;
    (c) adding a catalyst to the solution;
    (d) stirring the solution in a moisture free environment;
    (e) hydrolyzing the solution by exposing said solution to moisture;
    (f) adding fluorinated oxysilane to form modified nitrocellulose.

2. The process of claim 1, wherein the fluorinated oxysilane is (tridecafluoro-1,1,2,2-tetrahydrooctyl) trimethoxysilane.

3. The process of claim 2 wherein the solution is stirred for at least 24 hours after adding the (tridecafluoro-1,1,2,2-tetrahydrooctyl) trimethoxysilane.

4. The process of claim 1 wherein the organic solvent is an ester, ketone or alcohol.

5. The process of claim 1 wherein the organic solvent is tetrahydrofuran.

6. The process of claim 5 wherein the nitrocellulose to tetrahydrofuran is at a ratio of 2:25.

7. The process of claim 1 wherein the silyl based isocynate is 3-triethoxysilyl propyl isocyanate.

8. The process of claim 1, wherein the catalyst is dibutyl tin dilurate.

9. The process of claim 1 wherein stirring the solution in a moisture free environment is for at least 24 hours.

10. The process of claim 1, wherein the modified nitrocellulose produced from step (f) is separated using water.

11. The process of claim 1, further comprising filtering, washing and drying the modified nitrocellulose.

12. The process of claim 11, wherein the modified nitrocellulose is filtered and washed with water.

13. A process for preparing modified nitrocellulose having lyophobic properties comprising:
    (a) dissolving neat nitrocellulose in an organic solvent to form a solution;
    (b) adding 3-triethoxysilyl propyl isocyanate to the solution;
    (c) adding dibutyl tin dilurate to the solution;
    (d) stirring the solution in a moisture free environment;
    (e) hydrolyzing the solution by exposing said solution to moisture;
    (f) adding (tridecafluoro-1,1,2,2-tetrahydrooctyl) trimethoxysilane to form modified nitrocellulose.

* * * * *